Figure 1:
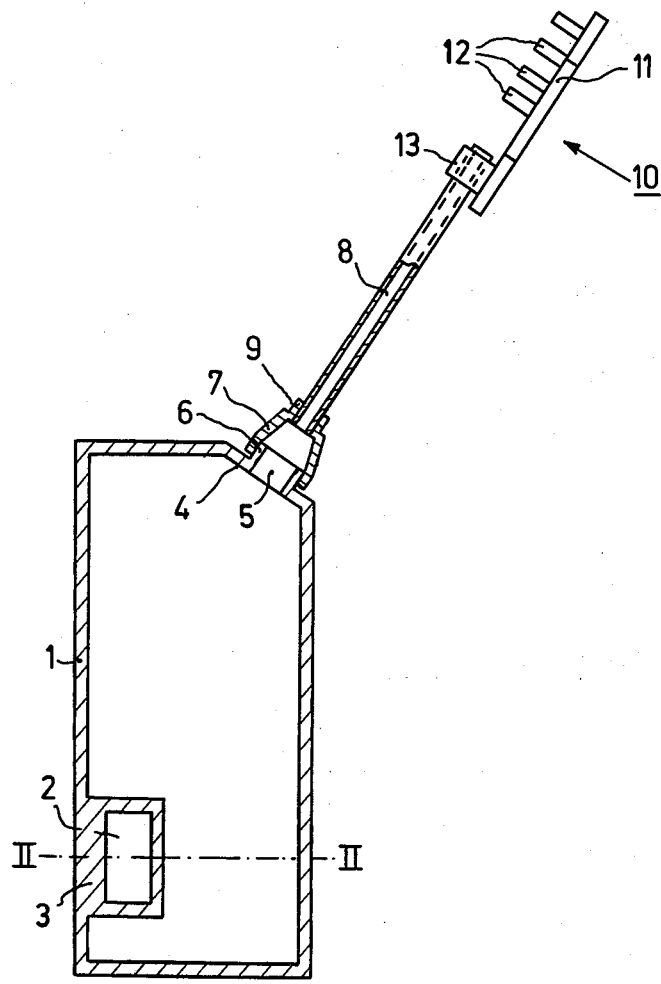

United States Patent [19]
Oosterhof

[11] B 3,997,119
[45] Dec. 14, 1976

[54] DEVICE FOR SPREADING GRANULES

[75] Inventor: Jan Oosterhof, Weesp, Netherlands

[73] Assignee: U.S. Philips Corporation, Briarcliff Manor, N.Y.

[22] Filed: Nov. 4, 1974

[21] Appl. No.: 520,534

[44] Published under the second Trial Voluntary Protest Program on February 17, 1976 as document No. B 520,534.

Related U.S. Application Data

[63] Continuation of Ser. No. 385,648, Aug. 6, 1973, abandoned.

[30] Foreign Application Priority Data

July 7, 1972 Netherlands ............... 7209463

[52] U.S. Cl. .................... 239/652; 239/377; 239/502
[51] Int. Cl.² ........................................ A01C 7/02
[58] Field of Search ........ 239/650, 652, 653, 689, 239/657, 374, 377, 498, 502, 376, 522, 514, 515; 222/205, 567, 568, 465

[56] References Cited
UNITED STATES PATENTS

| 156,688 | 11/1874 | Workman | 239/650 |
| 657,419 | 9/1900 | Jager | 239/650 |
| 714,051 | 11/1902 | Spitzenberg | 239/653 |
| 2,221,113 | 11/1940 | Schmitt | 239/652 |
| 2,337,952 | 12/1943 | Whiten | 239/653 X |
| 3,142,421 | 7/1964 | Sieracki | 222/567 X |

FOREIGN PATENTS OR APPLICATIONS 785,251  8/1935  France ............... 239/689

*Primary Examiner*—John J. Love
*Attorney, Agent, or Firm*—Frank R. Trifari; Norman N. Spain

[57] ABSTRACT

The invention relates to a device for spreading or scattering granular substances and is provided with a container, a delivery tube connected thereto and a distributor which is secured to the free end of the delivery tube. According to the invention the distributor comprises a flat or substantially flat plate, which on one side is provided with a multiplicity of protrusions distributed over the plate area. The protrusions are preferably cylindrical pins which extend perpendicular to the plate.

3 Claims, 4 Drawing Figures

DEVICE FOR SPREADING GRANULES

This is a continuation of application Ser. No. 385,648, filed Aug. 6, 1973, now abandoned.

The invention relates to a device for scattering or spreading granular substances, such as fertilizer granules and granular pesticide preparations, comprising a container, a delivery tube connected to the container and a distributor attached near the end of the delivery tube.

Such a device is known from French Patent Specification No. 785,251. The distributor described in this Patent Specification consists of a bent, scoop-shaped member which at one end comprises a tubular portion, the tubular portion being slid over the free end of the delivery tube. In the curved surface of the scooped member triangular apertures have been formed which on one side have a raised triangular tab. The openings and corresponding tabs are obtained by making V-shaped notches in the surface of the scooped member and subsequently bending the triangular portion bounded by the notches up or down. Some of the tabs are bent up, the others are bent down.

This known device has the drawback that owing to the curved shape of the scooped member, the lateral distribution of the granular material is not optimum. Furthermore, granules will drop out or fly out through the apertures bounded by tabs and possibly hit the operator's body.

The Applicant has developed a device of the type mentioned in the preamble, which does not have said drawbacks.

By means of the device according to the invention optimum distribution, especially lateral distribution, of granules can be achieved without the operator running the risk of being contaminated with the material. Furthermore, the device according to the invention can be manufactured particularly inexpensively and simply.

The device according to the invention is characterized in that the distributor comprises a flat or substantially flat plate which on one side is provided with a multiplicity of protrusions distributed over the plate area.

The protrusions may, for example, have an oval, circular, or polygonal cross-section and may or may not extend perpendicular to the flat plate.

In a favorable embodiment of the device according to the invention, the protrusions consist of cylindrical pins which extend perpendicular to the flat plate, the length of said pins, although this is not essential, being substantially equal to the outside diameter of the delivery tube.

In a further favorable embodiment a covering plate is attached over the free ends of the protrusions, said plate extending parallel to the previously described flat plate.

Figure 3:
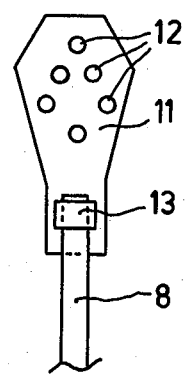
Figure 4:
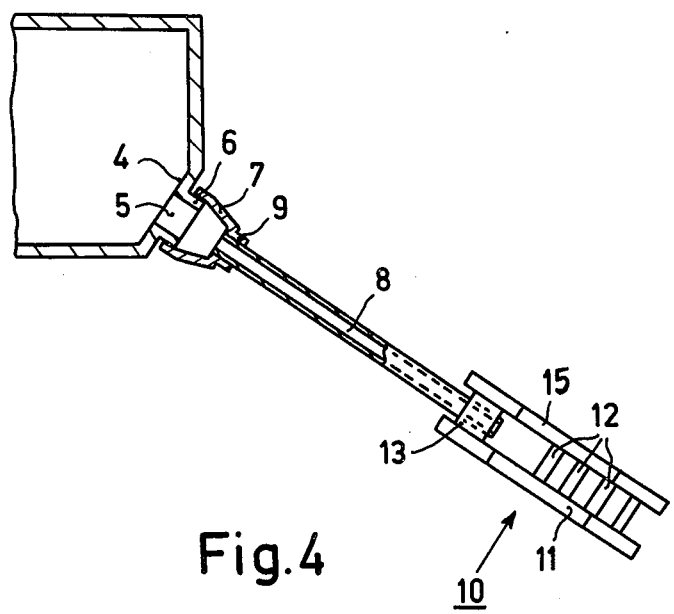

The invention will now be described, by way of example, with reference to the drawing, in which FIG. 1 is a sectional view of the device according to the invention, FIG. 2 a cross-sectional view taken on the line A—A of FIG. 1, FIG. 3 a top plan view of the distributor of the device according to the invention and FIG. 4 is a sectional view of a segment of a device according to the invention.

The reference numeral 1 in FIG. 1 refers to a container, which near the bottom is provided with a recess 2 which together with rib 3 forms a grip. At the top the container has a bevelled portion 4, which is provided with a circular aperture 5 and a collar 6. A union 7 for a delivery tube 8 fits around the collar 6. Collar 6 and union 7 are detachably connected to each other. In the embodiment shown the connection between collar 6 and union 7 is established by the friction between the two members. It is also possible to connect collar 6 and union 7 in a detachable manner by, for example, a bayonet coupling or screwed coupling. The delivery tube 8 is secured with one end in a cylindrical duct 9 of union 7. The other, free end of the delivery tube 8 is provided with a distributor 10. This distributor comprises a flat plate 11, which on one side is provided with cylindrical pins 12 distributed over the plate area. The flat plate 11 furthermore comprises a clamping ring 13, which is slipped over the free end of delivery tube 8. The clamping ring 13 is located on the same side of plate 11 as the pins 12.

Figure 2:
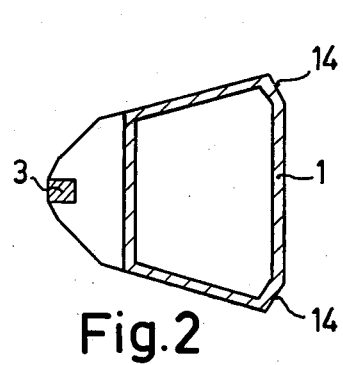

FIG. 2 is a sectional view of the device according to the invention, taken on the line A—A in FIG. 1. In FIG. 2 the parts corresponding to those of FIG. 1 have the same reference numerals. FIG. 2 shows that the corners between the upright sidewalls of the container 1 are slightly flattened. The flattened portions are designated by the reference numeral 14.

FIG. 3 is a top plan view of the distributor, which is marked 10 in FIG. 1. Again the same reference numerals are used for corresponding parts. FIG. 3 illustrates the shape of the flat plate 11 as well as the distribution of the pins 12 over the area of the plate 11.

FIG. 4 is a sectional view of a segment of the device shown in FIG. 1 and in addition shows a covering plate 15 having the same shape as the flat plate 11.

When using the device according to the invention, the union 7 and the delivery tube 8 and distributor 10 connected thereto are removed. Subsequently, the container 1 is filled via the aperture 5 with the granules to be distributed. Union 7, delivery tube 8 and distributor 10 are refitted and the device is then ready for use.

By means of grip 2, 3 the device is tilted in such a way that the delivery tube with the distributor faces downwards. As a result of gravity the granules flow through the delivery tube 8 and over the flat plate 11. The granules then hit the upright pins 12 and as a result they are spread, in particular in the lateral direction. If desired, a covering plate 15, which for example may have the same shape as the plate 11, may be fixed over the free ends of the pin 12. This ensures that scattering up of granular material is absolutely impossible.

What is claimed is:

1. A hand portable combination granular container and spreader comprising a container provided with bottom, top and side wall portions and a downward projecting tubular member located at one of said side wall portions, a downwardly projecting delivery tube detachably coupled into said tubular member and a granule distributer adjustably attached to the end of said delivery tube, said distributer comprising a substantially flat plate having a major axis substantially parallel to the axis of said delivery tube and provided on the surface of said plate adjacent to the opening of said delivery tube, with a multiplicity of protrusions extending in a direction substantially perpendicular to said surface.

2. A device as claimed in claim 1, characterized in that the protrusions are formed by cylindrical pins which extend perpendicular to the flat plate, the length of said pins being substantially equal to the outside diameter of the delivery tube.

3. A device as claimed in claim 2, characterized in that a covering plate is attached over the free ends of the pins, said plate extending parallel to the flat plate.

* * * * *